July 20, 1937.  R. H. BALDWIN  2,087,424
VEHICLE ATTACHED JACK
Filed July 12, 1935  4 Sheets-Sheet 3
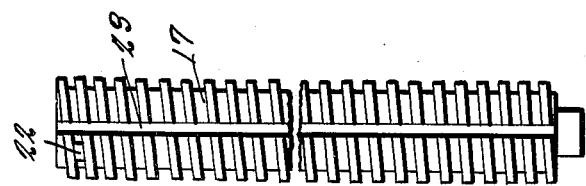
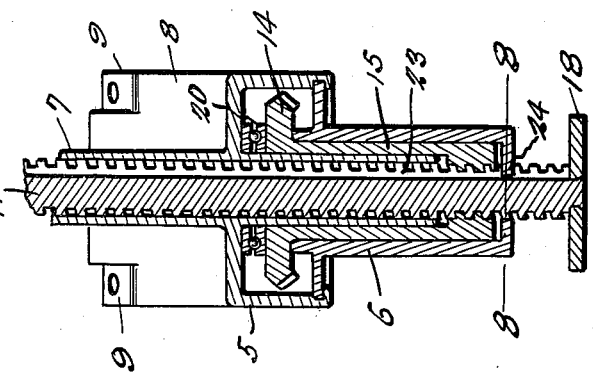
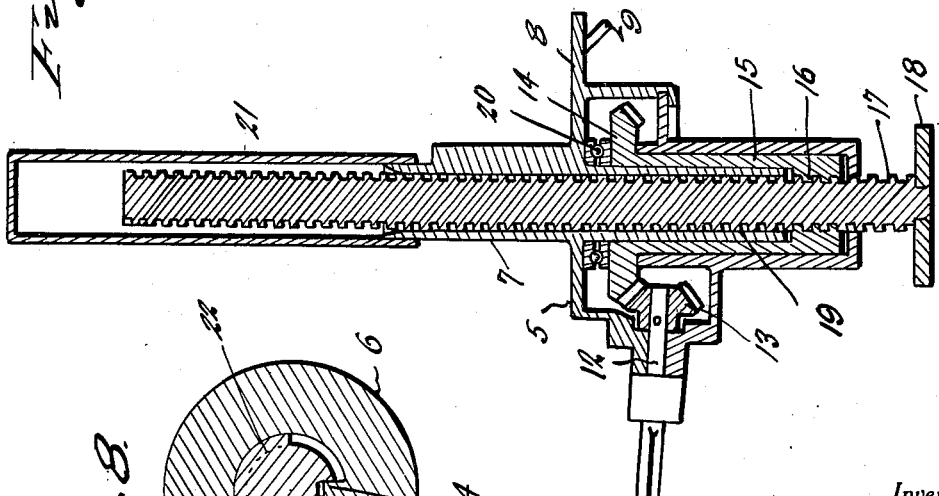
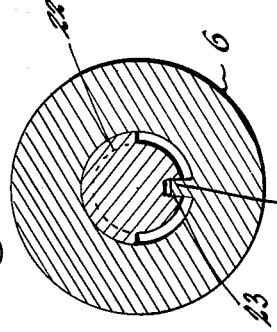
Inventor
Richard H. Baldwin
By Clarence A. O'Brien
Attorney

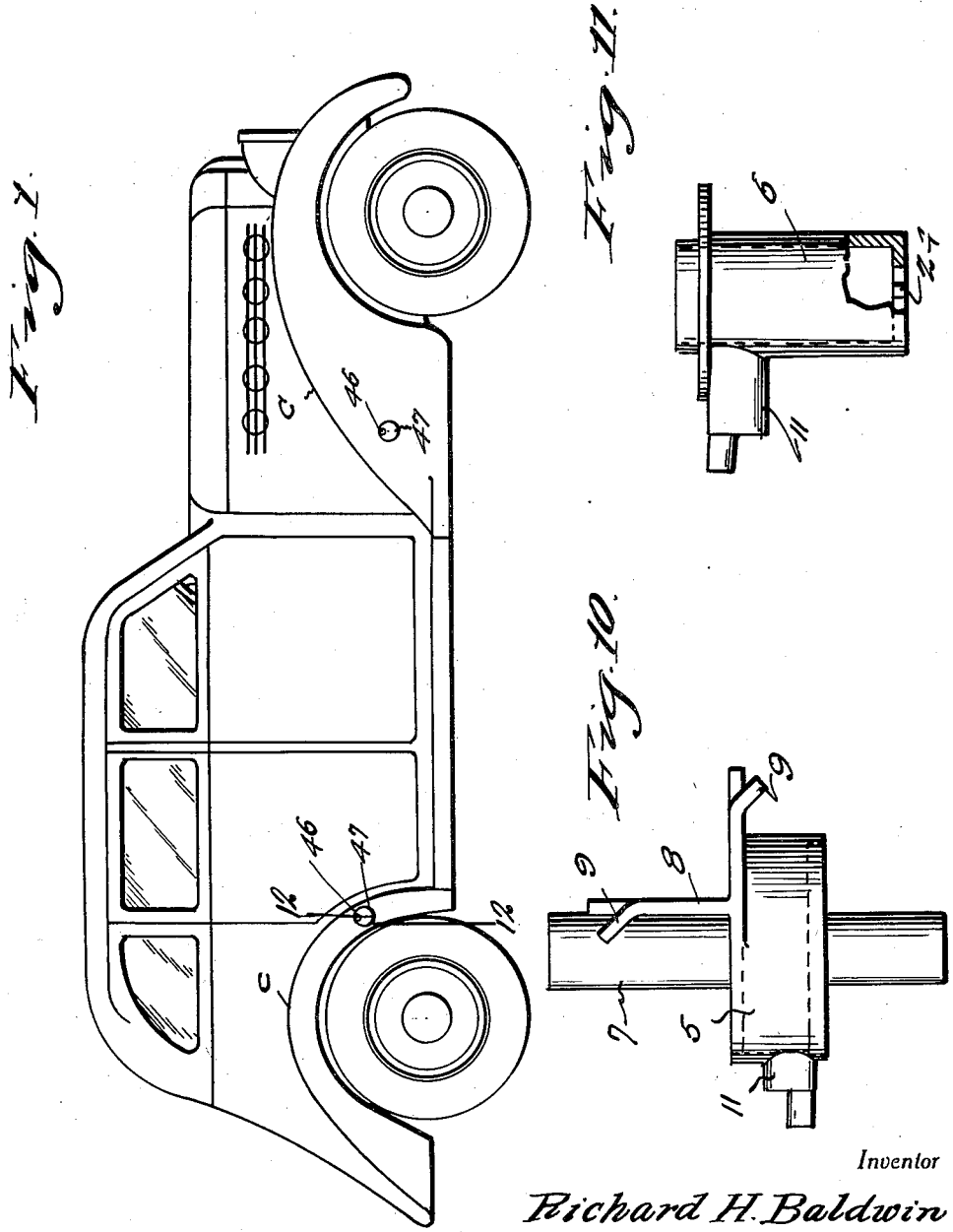

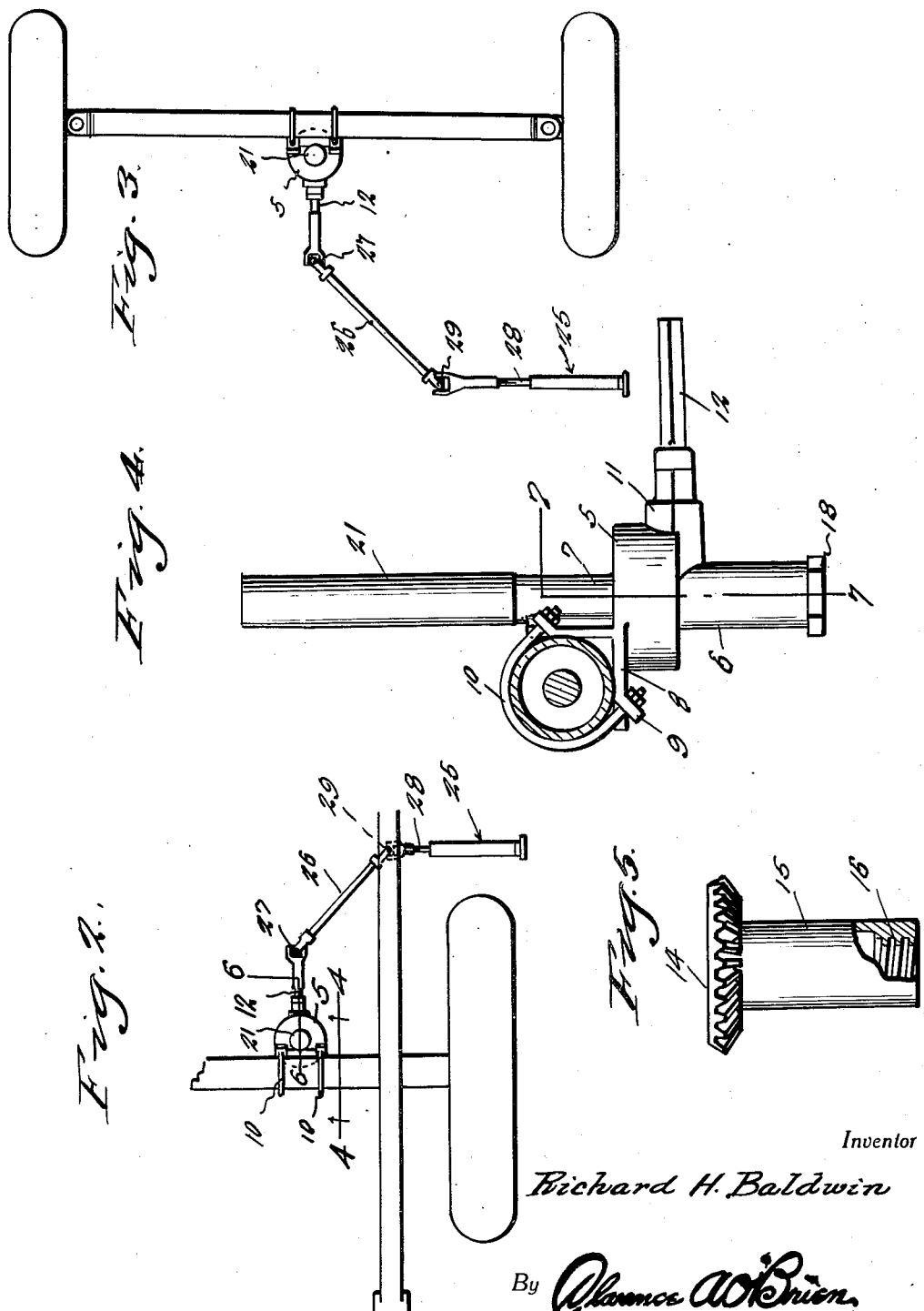

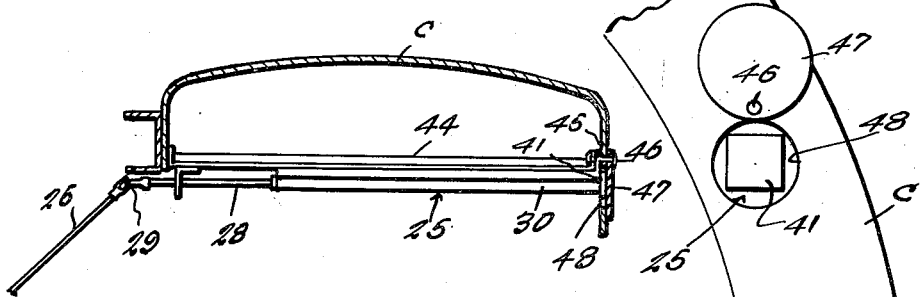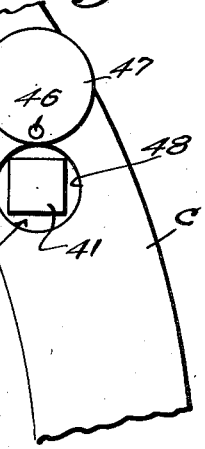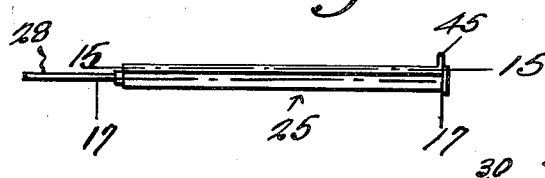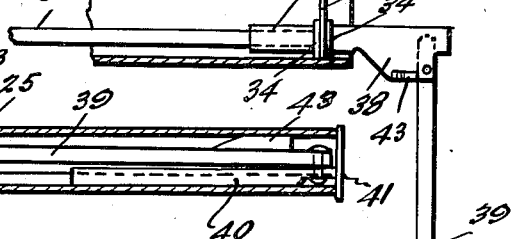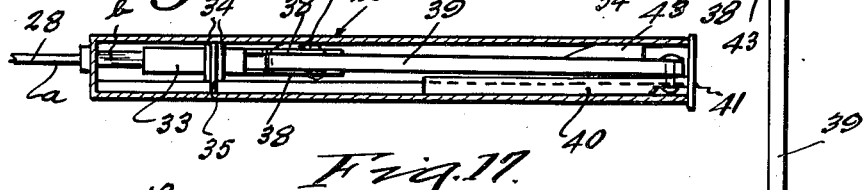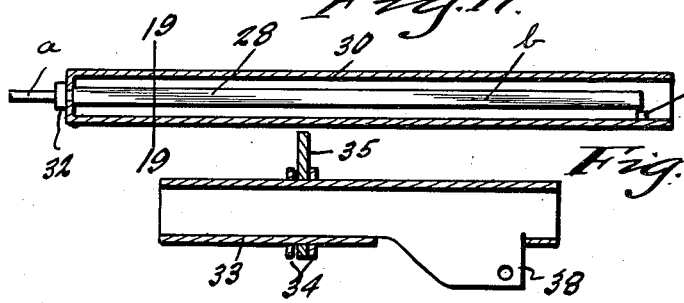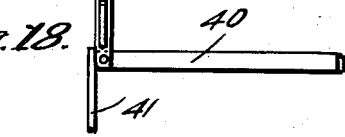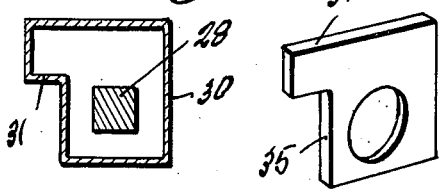

Patented July 20, 1937

2,087,424

UNITED STATES PATENT OFFICE 2,087,424

VEHICLE ATTACHED JACK

Richard H. Baldwin, Columbus, Ohio, assignor of one-half to William Trautman, Columbus, Ohio Application July 12, 1935, Serial No. 31,122

4 Claims. (Cl. 254—86)

This invention appertains to new and useful improvements in vehicle lifting jacks and more particularly to a jack and operating means therefor of the character permanently attached to the vehicle.

The principal object of the present invention is to provide a vehicle jack involving a permanently attached jack and permanently located operating means for the jack conveniently located at some desirable point on the body of the vehicle.

Another important object of the invention is to provide operating means for vehicle jacks which is normally maintained in a concealed position but which can be readily reached and disposed in position for use.

Another important object of the invention is to provide operating means for vehicle attached jacks wherein the operating means is constantly connected with the jack, but which can be collapsed and disposed out of view in a convenient manner.

Still another important object of the invention is to provide a vehicle attached jack and operating means therefor wherein the operating means is constructed in such a manner as to afford a retention against self operation of the jack.

These and various other important objects and advantages of the invention will become apparent to the reader of the following specification.

In the drawings:

Figure 1 represents a side elevational view of an automobile showing the body equiped with the present invention.

Figure 2 represents a fragmentary top plan view showing one of the rear jacks.

Figure 3 represents a fragmentary top plan view showing the front jack.

Figure 4 represents a vertical sectional view taken substantially on line 4—4 of Figure 2.

Figure 5 represents a side elevational view with a part broken away of the driven gear.

Figure 6 represents a vertical sectional view through one of the jacks.

Figure 7 represents a fragmentary vertical sectional view through the jack on a plane at right angles to the plane on which the section 6 is taken.

Figure 8 represents a cross section taken substantially on line 8—8 of Figure 7.

Figure 9 represents a fragmentary side elevational view of the screw.

Figure 10 represents a side elevational view of the upper section of the jack without the screw.

Figure 11 represents a side elevational view with a part broken away showing the lower section of the jack housing.

Figure 12 is a fragmentary sectional view taken substantially on line 12—12 of Figure 1.

Figure 13 represents a fragmentary side elevational view of a fender equipped with the jack operating means.

Figure 14 represents a fragmentary side elevational view of the jack operating means.

Figure 15 represents a longitudinal sectional view through the jack operating means showing the crank in collapsed position.

Figure 16 represents a fragmentary longitudinal sectional view through the operating means showing the crank in operative position.

Figure 17 represents a sectional view taken substantially on line 17—17 of Figure 14.

Figure 18 represents a longitudinal sectional view through the shaft slider.

Figure 19 represents a cross sectional view taken substantially on line 19—19 of Figure 17.

Figure 20 represents a sectional view of the guide plate.

Referring to the drawings wherein like numerals designate like parts, it can be seen that the jack structure shown in Figures 6 and 7 consists of a housing made up of the upper section 5 and the lower section 6 (see Figures 10 and 11). The upper section 5 forms the gear casing proper and this section 5 is provided with an upstanding tube 7 on which the angular formation 8 is provided to serve as part of the clamping means whereby the jack is clamped to an axle or the housing of the axle. This structure 8 is provided with lugs 9 through which U-bolts 10 can be disposed in the manner suggested in Figure 2.

The upper and lower sections 5—6 of the jack housing are provided with complementary sections of a tubular outstanding shaft bearing 11 through which the drive shaft section 12 is journaled. At the inner end of this shaft section 12 is located the beveled pinion 13 which meshes with the beveled gear 14 at the upper end of the barrel 15, this barrel being disposed downwardly into the cylindrical portion of the section 6. The lower portion of this barrel 15 is provided with internal threads 16 and the threads are located in this manner on the barrel 15 to mesh with the elongated screw 17 so that as much thrust of the screw as possible can be had in the limited operating space.

This screw 17 is provided with a ground engaging plate 18 at its lower end and the same extends upwardly through the tube 19 which depends from the top portion of the section 5 and extends between the barrel 15 and the screw, as well as upwardly through the tubular upstanding structure 7 on the section 5. A ball bearing assembly 20 is provided between the gear 14 and the top of the housing section 5.

An elongated tubular cover 21 disposed at its upper end is slipped over the upper end of the tube 7 on the section 5 to serve as a dust protector.

As can be seen in Figure 9, a suitable stop 22 is provided for the thread of the screw and this screw is provided with a longitudinally extending groove 23 which receives the lug 24 on the lower end of the section 6, which of course, compels the screw to reciprocate and not to rotate.

As is shown in Figure 2, the operating means involves the assembly generally referred to by numeral 25. The section 12 having the gear 13 extends from the jack and is connected to the connecting rod 26 by a universal joint 27 and as can be seen in Figure 2 the shaft 28 of the assembly 25 is also connected to the connection rod 26 by a universal joint 29.

By referring to Figure 15, it can be seen that the assembly 25 is provided with an elongated casing 30 having a laterally extending portion 31. It can be seen, that the shaft 28 is provided with a round portion $a$ and the squared portion $b$, the shaft being swivelly disposed through the bolted end of the casing 30 as at 32.

The crank structure involves a transversely square slider 33 having a pair of spaced ribs 34 thereon between which the guide plate 35 is free to rotate on the slider 33. This slider is movable on the squared portion of the shaft 28 and when the assembly 25 is in proper order, a small set screw 36 projecting into the casing 30 acts as a stop for the plate 35. It can be seen that the plate 35 is provided with an offset portion 37 received by the offset portion 31 of the casing 30.

The slider 33 is provided with a pair of laterally disposed flanges 38 between which one end of the elongated link 39 is swivelly connected to the slider. To the other end of the link 39 a handle 40 is pivotally secured and the pivotal end of the handle 40 carries a closure plate 41 for the open end of the casing 30.

It can now be seen, that normally, when the assembly 25 is out of use, the slider 33 is at the inboard end of the casing 30 with the handle 40 collapsed against the link 39 and brought together in substantial parallel relation to the shaft 28, the handle 40 and perhaps the link 39 being disposed into the offset portion 31 of the casing, in which position, the shaft 28 is prevented from accidentally rotating and causing accidental operation of the jack.

Suitable filler ribs or bosses 43 can be provided on the link 39 and the flanges 38 so as to prevent rattling of the parts when in collapsed position.

It will be noted, that for the rear wheels two jacks are employed while only one jack is provided at the front axle. Therefore, the control for the front jack will come through one of the front fenders, but of course there is nothing to prevent control being made accessible through both front fenders to control the single front jack. Furthermore, it is not necessary that the assembly 25 be located at the exact position on the body of the car as shown in Figure 1, but may be higher or lower. While it is desirable to have the same on the fender it is possible to place the same elsewhere on the vehicle.

Referring to Figure 12, it can be seen that under the fender $c$ and spanning the side walls thereof is the angle iron support 44 and it will be observed that the casing 30 is provided with an upstanding flange 45. A rivet 46 passes through one end of the angle iron 44, which is suitably flanged at this end, through the flange 45 and also through the adjacent wall of the fender $c$, to extend through the swingable closure plate 47 which normally serves to close the opening 48 in the fender $c$ when the assembly 25 is not in use.

Obviously, the closure 47 can be swung to a position shown in Figure 13 and the closure or cap plate 41 on the handle 40 can be pulled outwardly after which the link members 39—40 can be swung to the position shown in Figure 16 to permit rotation of the shaft 28 and consequent operation of the jack.

While the foregoing specification sets forth the invention in specific terms it is to be understood that numerous changes in the shape, size and materials may be resorted to without departing from the spirit and scope of the invention as claimed hereinafter.

Having thus described the invention, what is claimed as new is:

1. In combination with a vehicle, a vehicle attached jack, a casing, a shaft rotatably mounted in the casing, said casing being mounted so as to terminate at one end at the side of the vehicle, a connection between the jack and the shaft, and a slidable and collapsible handle on the said shaft, and said casing being provided with an offset therein to receive the collapsed handle to prevent rotation of the shaft and accidental operation of the jack.

2. In combination, a jack, a handle, a case for receiving the handle, an operating connection between the handle and the jack, and means slidably connecting the handle to said connection permitting extension of said handle from the case.

3. In combination, a jack, a handle, a case for receiving the handle, an operating connection between the handle and the jack, and means slidably connecting the handle to said connection permitting extension of said handle from the case, said case having a construction defining a stop, said handle having a pivotal crank portion adapted to be folded against the remaining portion of the handle and to engage said stop when the entire handle is disposed in the case.

4. In combination, a jack, a handle, a case, a vehicle fender, said fender being provided with an opening therein, said case being secured to the fender so that one end registers with the said opening, said case being adapted to receive the handle, an operating connection between the handle and the jack, and means slidably connecting the handle to said connection permitting extension of said handle from the case and outwardly of the said fender.

RICHARD H. BALDWIN.